H. P. KRAFT.
DUST CAP FOR TIRE VALVES OR THE LIKE.
APPLICATION FILED DEC. 17, 1914.
1,319,155.   Patented Oct. 21, 1919.
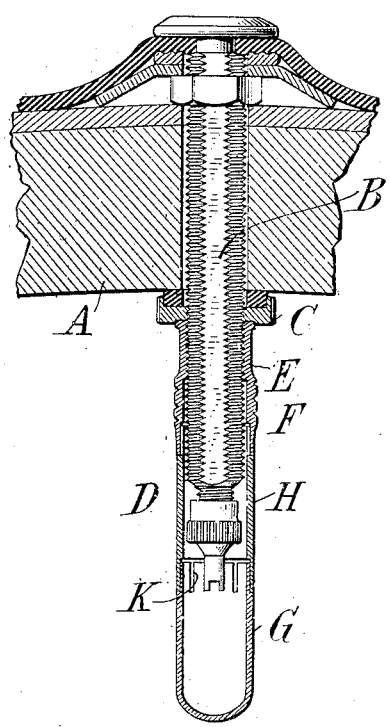
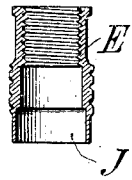
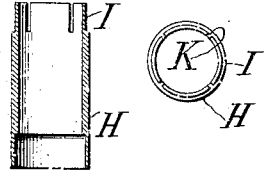
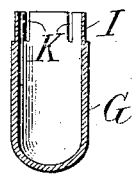
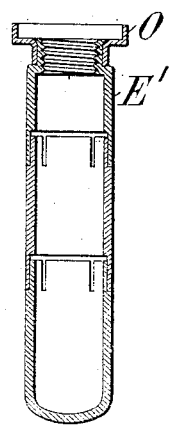
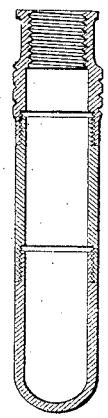
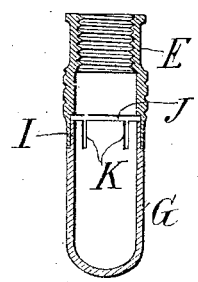
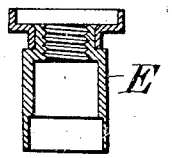
WITNESSES:
Rene' Pruine
Fred White
INVENTOR
Henry P. Kraft,
By Attorneys,
Fraser, Turk & Myers

UNITED STATES PATENT OFFICE.

HENRY P. KRAFT, OF RIDGEWOOD, NEW JERSEY.

DUST-CAP FOR TIRE-VALVES OR THE LIKE.

1,319,155.   Specification of Letters Patent.   Patented Oct. 21, 1919.

Application filed December 17, 1914. Serial No. 877,792.

*To all whom it may concern:*

Be it known that I, HENRY P. KRAFT, a citizen of the United States, residing in Ridgewood, in the county of Bergen and State of New Jersey, have invented certain new and useful Improvements in Dust-Caps for Tire-Valves or the like, of which the following is a specification.

This invention relates to dust caps for tire valves or the like, and aims to provide certain improvements therein.

In the use of tire valves the valve commonly projects through the rim, and it is usual to provide a dust cap which screws over the projecting end of the valve for the purpose of protecting it from dust, injury, etc. The projecting portion of the valve varies in individual cases on account of the difference in the thickness of the wheel felly, and sometimes on account of the difference in the length of the valve. It is customary to construct a cap of a fixed or standard length which occasionally will be found too short to adequately cover the valve. Such dust caps usually screw onto the valve or have some other means of connection with it, and on account of the difference of the diameters of valves, different sizes of caps are usually employed. According to the present invention I provide a cap composed of two or more sections which have a means of connection with each other whereby the length may be varied, and also the diameter of the foot or the attaching portion of the cap. Such caps usually screw along the entire projecting portion of the valve, so that the operation of applying and removing the dust cap is a lengthy one. According to the present invention the connection between the sections of the cap is preferably a quick connection such as a short screw-thread or the like, so that in order to obtain access to the valve for inflating or other purposes a portion of the cap may be quickly removed without disturbing the foot. The invention also includes certain other features of improvement which will be hereinafter pointed out.

Referring to the drawings, which show several embodiments of the invention,—

Figure 1 is a section of a wheel felly, showing a valve in elevation and the improved dust cap in diametrical section.

Fig. 2 is an elevation of the dust cap.

Fig. 3 is a sectional view of the foot of the cap.

Fig. 4 is a sectional view of an intermediate section.

Fig. 5 is a sectional view of the end section.

Fig. 6 is a plan of Fig. 4.

Fig. 7 is a diametrical section of the dust cap in its shortened form.

Fig. 8 is a sectional view of a modification.

Fig. 9 is a diametrical section of a form of dust cap having a washer swiveled thereto.

Fig. 10 is a similar view of a cap adapted for a smaller valve.

Referring to the drawings, let A indicate a wheel felly of usual construction and B a common form of tire valve. The tire valve is usually clamped in place by a rim nut C, although in certain cases this may be omitted and the dust cap D utilized to clamp the valve in place.

The dust cap D provided by the invention is, as shown, formed in a plurality of sections. The foot section or that just contiguous to the felly is indicated by the letter E. This section is usually formed with a screw-threaded interior designed to engage the threads of the valve, although it may engage other parts to hold it in place. It is usually formed with a nurling or other roughened surface to form a finger or wrench hold in screwing it on or unscrewing it. In the construction shown the outer end of the cap is formed of a closed end section G, and if the cap is required to be of considerable length an intermediate section H is employed, or several of such sections. Each of the sections is preferably adapted to form a connection with each of the other sections. In the construction shown in Figs. 1 to 7 this form of connection is by a slip joint. As illustrated, one part is formed with a reduced portion such as I, which is adapted to enter a recess such as J in the next contiguous part. In order to secure a tight frictional fit, the reduced portion is preferably slotted, as shown at K, thus dividing it into a series of spring arms. In such construction the parts retain their position by friction. In the construction shown in Fig. 8 the connection is a screw-threaded one. Obviously other connections can be adopted.

The sections are interchangeable, so that the end portion G may fit the foot portion E, or one or more intermediate lengths, such as H may be introduced between the two.

By the present invention if the projecting end of the valve is long, three or more sections may be used, while if the latter is short, the end and foot portions may be directly connected, thus shortening the cap.

In Fig. 9 I have illustrated a construction in which a washer O (which may carry a packing ring) is swiveled to the foot section E'.

As valves of different diameters are commonly employed, foot portions having different diameters may be interchangeably used. This is illustrated in Fig. 10, wherein the internal diameter of the screw-threaded portion of the foot $E^2$ is less than in Fig. 9, being designed to engage a smaller valve.

By the present invention various lengths of valve may be accommodated, and the operation of manufacturing is much facilitated. Instead of keeping various lengths and diameters of dust caps in stock, it is necessary only to keep different diameters of foot sections. It is customary to form dust caps of long cups which is a difficult drawing operation. By the present invention each part is short, and is easily drawn. In the use of this cap the operation of inflating or deflating is greatly facilitated, since it is necessary only to remove one or more of the outer sections of the cap in order to expose the end of the valve. In the preferable forms where the sections are quickly detachable, this occupies only a moment's time. The foot of the cap which ordinarily requires a longer time to screw it in place, is permitted to remain in position. This is particularly advantageous where the rim nut is omitted, and the dust cap is relied upon to clamp the valve in place, since it is not necessary to disturb this connection in order to inflate or deflate the tire.

While I have described the invention with reference to a dust cap for tires, it may be applied to other analogous articles.

While I have shown and described several forms of the invention, it will be understood that I do not wish to be limited thereto, since various changes may be made therein without departing from the spirit of the invention.

What I claim is:

1. In dust caps, the combination of a foot section, and end section, and an intermediate section, said intermediate section being adapted to engage the foot and end sections, and said end section being adapted to engage said foot section.

2. In dust caps, the combination of a foot section, an end section, and an intermediate section, said intermediate section being adapted to frictionally engage the foot and end sections, and said end section being adapted to frictionally engage said foot section.

3. In dust caps, the combination of an end section and a plurality of foot sections having different internal diameters, said end section being adapted to be interchangeably connected with said foot sections.

4. In dust caps, the combination of an end section, a plurality of foot sections having different internal diameters, and an intermediate section, said intermediate section being adapted to engage each of said foot sections, and also to engage said end section.

In witness whereof, I have hereunto signed my name in the presence of two subscribing witnesses.

HENRY P. KRAFT.

Witnesses:
    E. V. MYERS,
    FRED WHITE.